US 12,447,525 B2

(12) United States Patent
Sundaram et al.

(10) Patent No.: US 12,447,525 B2
(45) Date of Patent: Oct. 21, 2025

(54) APPLICATION OF A LEARNING AGENT TO ACHIEVE AUTONOMOUS OPERATION OF A TWIN ROLL CASTING MACHINE

(71) Applicant: Nucor Corporation, Charlotte, NC (US)

(72) Inventors: Neera Jain Sundaram, West Lafayette, IN (US); Jianqi Ruan, West Lafayette, IN (US); George T.C. Chiu, West Lafayette, IN (US); Ivan Parkes, Madison, AL (US); Walter N Blejde, Brownsburg, IN (US)

(73) Assignee: Nucor Corporation, Charlotte, NC (US)

( * ) Notice: Subject to any disclaimer, the term of this patent is extended or adjusted under 35 U.S.C. 154(b) by 106 days.

(21) Appl. No.: 18/604,802

(22) PCT Filed: Sep. 29, 2022

(86) PCT No.: PCT/US2022/045226
§ 371 (c)(1),
(2) Date: Mar. 14, 2024

(87) PCT Pub. No.: WO2023/055932
PCT Pub. Date: Apr. 6, 2023

(65) Prior Publication Data
US 2025/0229322 A1 Jul. 17, 2025

Related U.S. Application Data

(60) Provisional application No. 63/249,910, filed on Sep. 29, 2021.

(51) Int. Cl.
B22D 11/16 (2006.01)
B22D 11/06 (2006.01)

(52) U.S. Cl.
CPC .......... B22D 11/16 (2013.01); B22D 11/0622 (2013.01)

(58) Field of Classification Search
CPC .......................... B22D 11/16; B22D 11/0622
See application file for complete search history.

(56) References Cited

U.S. PATENT DOCUMENTS

| 6,085,183 A | 7/2000 | Horn et al. |
| 2015/0096712 A1 | 4/2015 | Dagner et al. |

(Continued)

FOREIGN PATENT DOCUMENTS

| WO | 2018141744 | 8/2018 |
| WO | 2019060717 A1 | 3/2019 |
| WO | 2021086929 A1 | 5/2021 |
| WO | 2024015601 A1 | 1/2024 |

OTHER PUBLICATIONS

International Preliminary Report on Patentability regarding PCT/US22/45226, dated Apr. 11, 2024 (8 pgs.).

(Continued)

Primary Examiner — Keith Walker
Assistant Examiner — Steven S Ha
(74) Attorney, Agent, or Firm — Hahn Loeser & Parks LLP

(57) ABSTRACT

A twin roll casting system comprises a pair of counter-rotating casting rolls having a nip between the casting rolls and capable of delivering cast strip downwardly from the nip; a casting roll controller configured to adjust at least one process control setpoint between the casting rolls in response to control signals; a cast strip sensor capable of measuring at least one parameter of the cast strip; and a controller coupled to the cast strip sensor to receive cast strip measurement signals from the cast strip sensor and coupled to the casting roll controller to provide control signals to the casting roll controller. The controller comprises a reinforce- (Continued)

ment learning (RL) Agent, the RL Agent generating control signals for the casting roll controller in response to a reward function having a first term rewarding emulating human operation of the process control setpoint and a second term rewarding a short set-up time.

17 Claims, 13 Drawing Sheets

(56) References Cited

U.S. PATENT DOCUMENTS

| | | |
|---|---|---|
| 2020/0009644 A1* | 1/2020 | Browne, III ......... B22D 11/168 |
| 2020/0241921 A1 | 7/2020 | Calmon et al. |
| 2021/0247744 A1 | 8/2021 | Fahrenkopf et al. |

OTHER PUBLICATIONS

Extended European Search Report in European Patent Application No. 22877330.5 dated Jul. 1, 2025, 8 pages.

Ruan Jianqi et al: "Applying a Deep Q-Network for Human Operator Behavioral Modeling and Decision Support in a Twin-Roll Casting Process", 2022 American Control Conference (ACC), American Automatic Control Council, Jun. 8, 2022, pp. 689-696, XP034180483, DOI: 10.23919/ACC53348.2022.9867390 [retrieved on Sep. 5, 2022].

International Search Report regarding PCT/US2022/045226, Mailed Dec. 23, 2022 (6 pgs.).

Written Opinion of the International Searching Authority regarding PCT/US2022/045226, Mailed Dec. 23, 2022 (2 pgs.).

* cited by examiner

APPLICATION OF A LEARNING AGENT TO ACHIEVE AUTONOMOUS OPERATION OF A TWIN ROLL CASTING MACHINE

RELATED APPLICATIONS

The application claims priority to and the benefit of U.S. Ser. No. 63/249,910, filed Sep. 29, 2021, which is incorporated by reference.

BACKGROUND

Twin-roll casting (TRC) is a near-net shape manufacturing process that is used to produce strips of steel and other metals. During the process, molten metal is poured onto the surface of two casting rolls that simultaneously cool and solidify the metal into a strip at close to its final thickness. This process is characterized by rapid thermo-mechanical dynamics that are difficult to control in order to achieve desired characteristics of the final product. This is true not only for steady-state casting, but even more so during "start-up", the transient period of casting that precedes steady-state casting. Strip metal produced during start-up often contains an unacceptable amount of defects. For example, strip chatter is a phenomenon where the casting machine vibrates around 35 Hz and 65 Hz. More specifically, the vibration causes variation in the solidification process and results in surface defections, as shown in FIGS. 1A and 1B. Chatter needs to be brought below an upper boundary before commercially acceptable strip metals can be made.

During both the start-up and steady-state casting processes, human operators are tasked with manually adjusting certain process control setpoints. During the start-up process, the operators' goal is to stabilize the production of the steel strip, including reducing chatter, as quickly as possible so as to minimize the length of the start-up period subject to certain strip quality metrics being satisfied thus increasing product yield by minimizing process start up losses. They do this through a series of binary decisions (turning switches on/off) and the continuous adjustment of multiple setpoints. In total, operators control over twenty switches and setpoints; for the latter, operators must determine when, and by how much, to adjust the setpoint.

Among the setpoints that operators adjust, the casting roll separation force setpoint (to be referred to as the "force setpoint" from here onward) is the most frequently adjusted setpoint during the start-up process. It may be adjusted tens of times in an approximately five-minute period. Operators consider many factors when adjusting the force setpoint, but foremost is the strip chatter, a strip defect induced by the natural frequencies of the casting machine.

Operators use various policies for adjusting the force setpoint. One is to consider a threshold for the chatter measurement; when the chatter value increases above the threshold, operators will start to decrease the force. However, individual operators use different threshold values based on their own experience, as well as factors including the specific grade of steel or width being cast. On the other hand, decreasing the force too much can lead to other quality issues within the steel strip; therefore, operators are generally trained to maintain as high a force as possible subject to chatter mitigation.

Attempts have been made to improve various industrial processes, including twin roll casting. In recent years, human-in-the-loop control systems have become increasingly popular. Instead of considering the human as an exogenous signal, such as a disturbance, human-in-the-loop systems treat humans as a part of the control system. Human-in-the-loop applications may be categorized into three main categories: human control, human monitoring, and a hybrid of these two. Human control is when a human directly controls the process, this may also be referred to as direct control. Supervisory control is a hybrid approach in which human operators adjust specific setpoints and otherwise oversee a predominantly automatically controlled process. Supervisory control is commonly occurring in industry and has up to now, been the predominant regime for operating twin roll casting machines. However, variation between human operators, for example in their personality traits, past experiences, skill level, or even their current mood, as well as varying, uncharacteristic process factors, continue to cause inconsistencies in process operation.

Modeling human behavior as a black box problem has been considered. More specifically, researchers agree that system identification techniques can be useful for modeling human behavior in human-in-the-loop control systems. These generally reference predictive models of human behavior and subsequently, controller designs based on the identified models. The effectiveness of this approach of first identifying a model of the human's behavior and then designing a model-based controller is dependent upon the available data. Disadvantageously, if the human data contains multiple distinct operator behaviors, due to significant variations between different operators, any identified model will likely underfit the data and lead to a poorly performing controller.

Moreover, proposed approaches have been aimed at characterizing the human operator's role as a feedback controller in a system, but instead of modeling the human operator's behavior, they identify an optimal control policy based on the system model. In other words, they do not directly learn from the policy used by experienced human operators. In some industrial applications, especially during highly transient periods of operation such as process start-up, system modeling can be extremely difficult and not all control objectives can be quantified. Thus, automating such a process using model-based methods is not trivial; instead, a methodology is needed for determining the optimal operation policy according to both explicit control objectives and implicit control objectives revealed by human operator behavior.

SUMMARY

A modified deep Q-network (DQN) algorithm trained to determine an optimal policy for setpoint adjustments during highly transient process operations, with application to a commercial steel manufacturing process such as a twin roll strip steel casting machine is provided. A major improvement over the art is the design of a reward function for a Reinforcement Learning (RL) Agent that blends explicit and implicit characterizations of the performance objectives, in part through clustering of multiple distinct human operator behaviors from the training data. In one example, over 200 sequences of industrial process data from a twin-roll steel strip casting machine are clustered based on the operators' setpoint adjustment behavior with respect to the casting roll separation force. The trained RL Agent can independently adjust the setpoint value of interest within the specified transient operation period as desired. The trained agent is responsive to the design of the implicit and explicit performance components of the reward function. The trained RL Agent continues to learn from the casting machine during operation.

In some embodiments, a twin roll casting system comprises a pair of counter-rotating casting rolls having a nip between the casting rolls and capable of delivering cast strip downwardly from the nip; a casting roll controller configured to adjust at least one process control setpoint between the casting rolls in response to control signals; a cast strip sensor capable of measuring at least one parameter of the cast strip; and a controller coupled to the cast strip sensor to receive cast strip measurement signals from the cast strip sensor and coupled to the casting roll controller to provide control signals to the casting roll controller. The controller comprises a reinforcement learning (RL) Agent, the RL Agent generating control signals for the casting roll controller in response to a reward function having a first term rewarding emulating human operation of the process control setpoint and a second term rewarding a short set-up time.

In some embodiments, the RL Agent is model-free, such as a model-free Deep Q Network.

In some embodiments, reward function further has a third term rewarding maintaining the at least one parameter of the cast strip below a threshold. The cast strip sensor may comprise a thickness gauge that measures a thickness of the cast strip in intervals across a width of the cast strip.

In some embodiments, the process control setpoint comprises a force setpoint between the casting rolls and the parameter of the cast strip comprises chatter. In some embodiments, the reward function further has a third term rewarding maintaining the chatter below a threshold.

The at least one process control setpoint may comprise casting roll crown and the parameter of the cast strip may comprise cast strip profile. The at least one parameter of the cast strip may comprise chatter and at least one strip profile parameter. The at least one strip profile parameter one or more of edge bulge, edge ridge, maximum peak, and high edge flag.

In some embodiments, the RL Agent is trained on a plurality of training datasets, and wherein the training datasets are clustered, and first term of the reward function comprises emulating behavior from a preferred cluster.

A method of operating a twin roll casting system having a pair of counter-rotating casting rolls having a nip between the casting rolls and capable of delivering cast strip downwardly from the nip and a casting roll controller configured to adjust at least one process control setpoint between the casting rolls in response to control signals, includes the following steps: measuring at least one parameter of the cast strip; receiving measurements corresponding to the at least one parameter by a controller, the controller comprising an reinforcement learning (RL) Agent, the RL Agent generating control signals for the casting roll controller in response to a reward function having a first term rewarding emulating human operation of the process control setpoint and a second term rewarding a short set-up time; and providing the control signals the controller to the casting roll controller.

In some embodiments, the RL Agent is a model-free Deep Q Network. In some embodiments, the at least one process control setpoint comprises a force setpoint between the casting rolls; the at least one parameter of the cast strip comprises chatter; and the reward function further has a third term rewarding maintaining the chatter below a threshold.

DETAILED DESCRIPTION

Figure 1A:
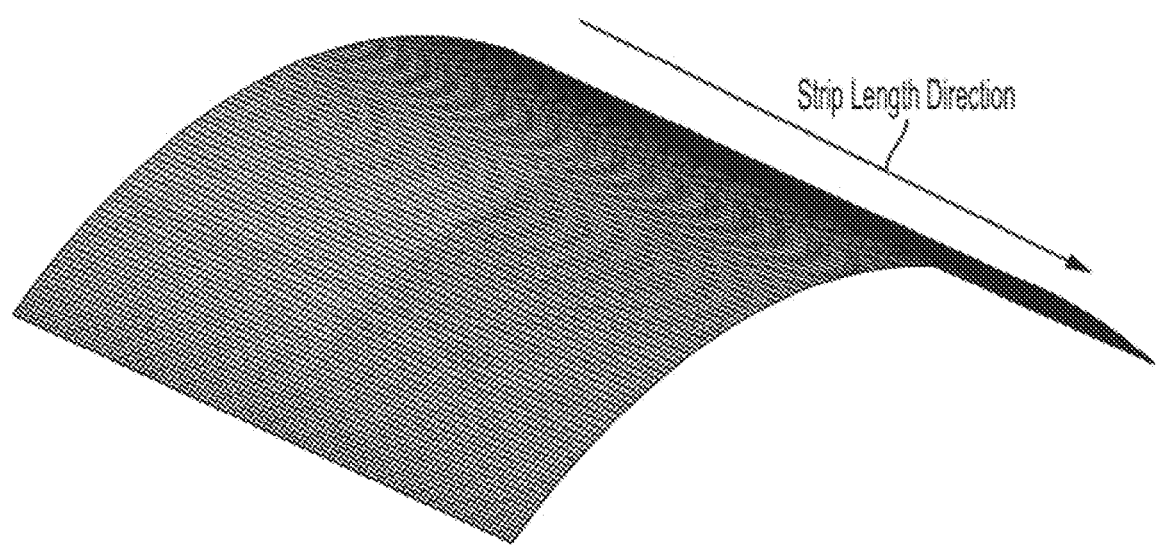
FIG. 1A is a strip profile without chatter defects.
Figure 1B:
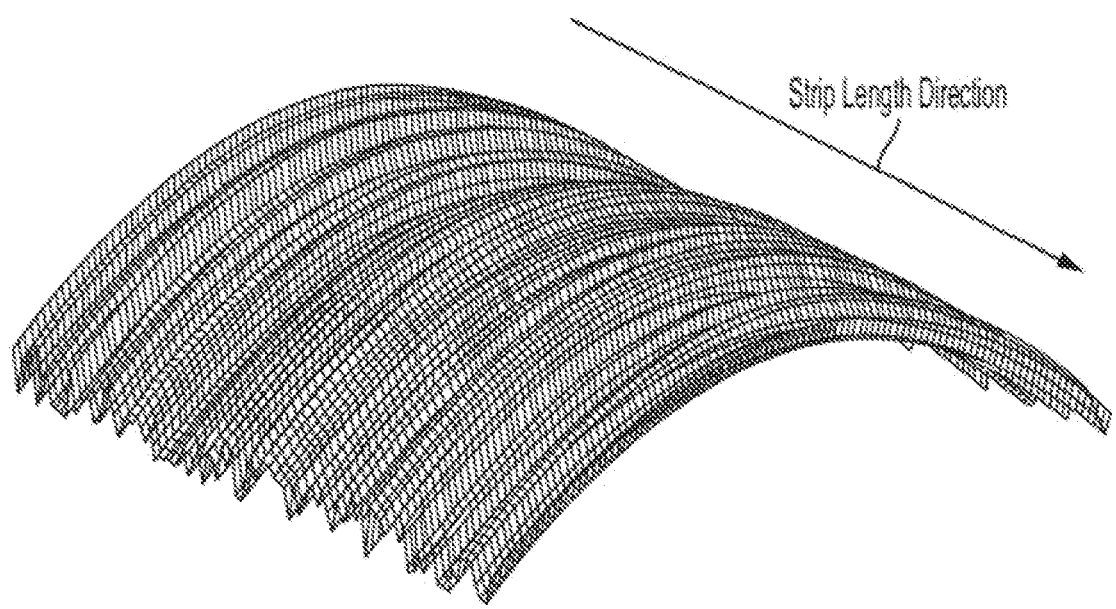
FIG. 1B is a strip profile with chatter defects.
Figure 2:
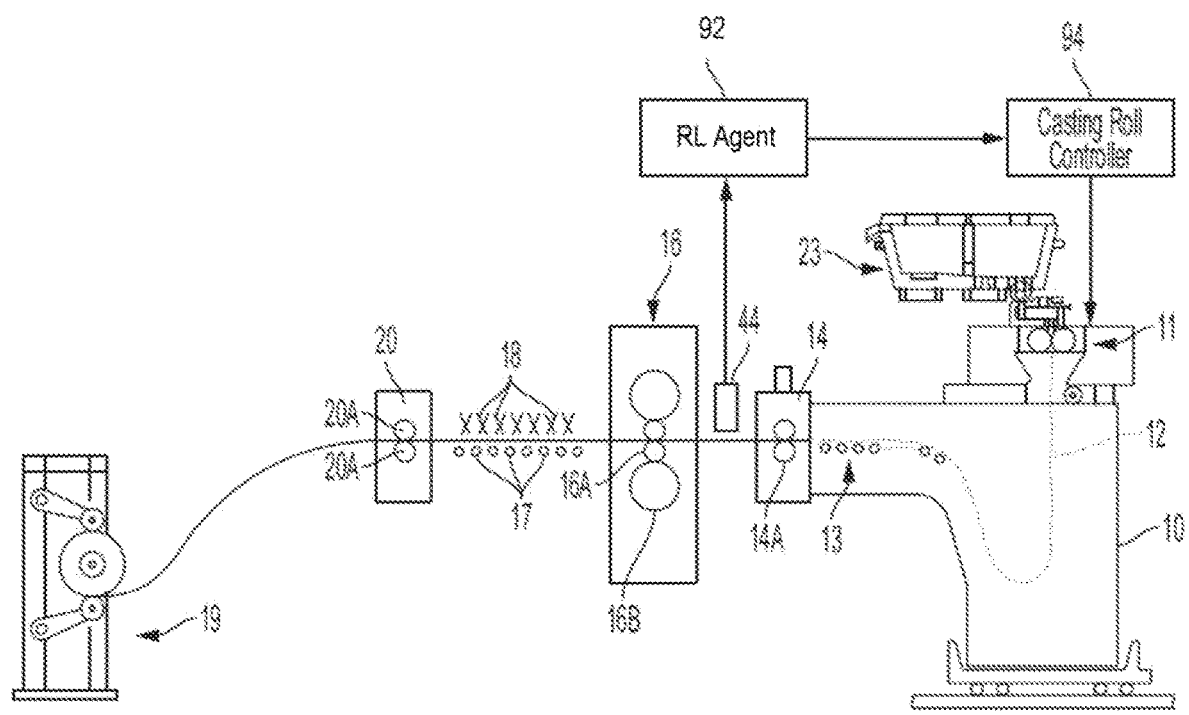
FIG. 2 is an illustration of a twin roll caster according to at least one aspect of the invention.
Figure 3:
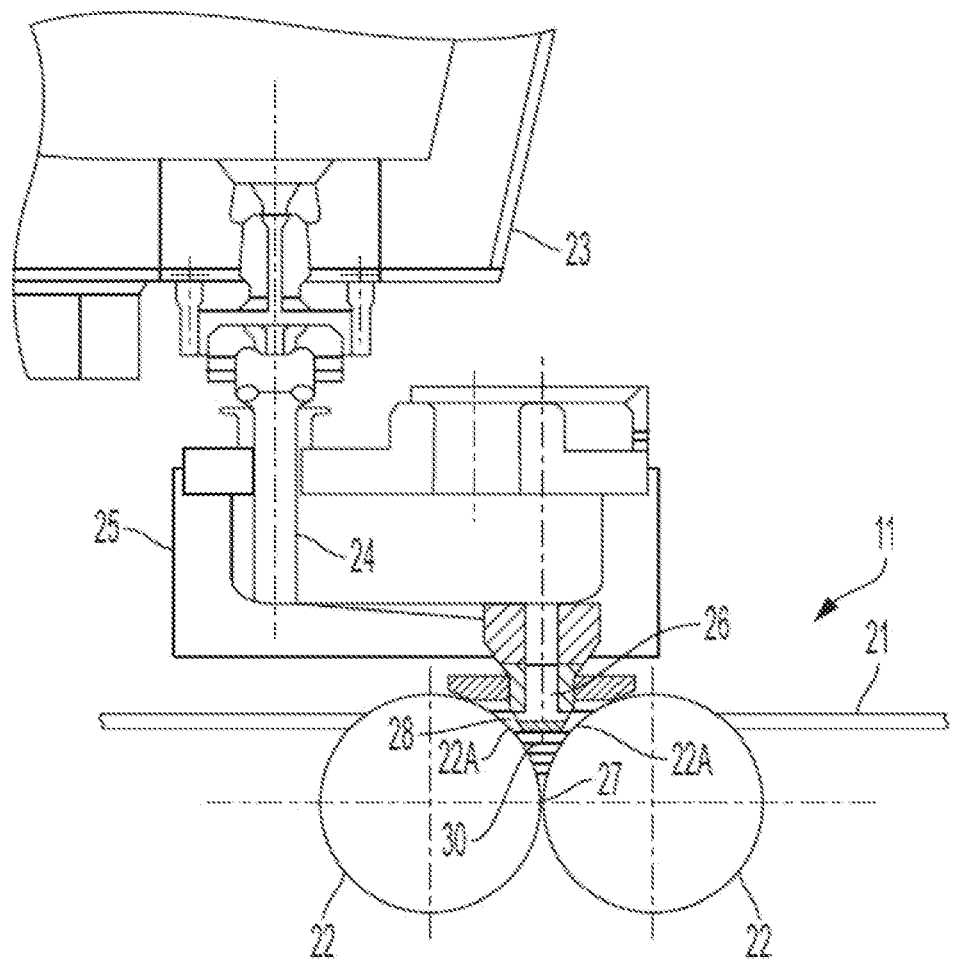
FIG. 3 is an illustration of details of the twin roll caster illustrated in FIG. 2 . . . .

Referring to FIGS. 2 And 3, a twin-roll caster is denoted generally by 11 which produces thin cast steel strip 12 which passes into a transient path across a guide table 13 to a pinch roll stand 14. After exiting the pinch roll stand 14, thin cast strip 12 passes into and through hot rolling mill 16 comprised of back up rolls 16B and upper and lower work rolls 16A where the thickness of the strip reduced. The strip 12, upon exiting the rolling mill 15, passes onto a run out table 17 where it may be forced cooled by water (or water/air) jets 18, and then through pinch roll stand 20 comprising a pair of pinch rolls 20A and to a coiler 19.

Twin-roll caster 11 comprises a main machine frame 21 which supports a pair of laterally positioned casting rolls 22 having casting surfaces 22A and forming a nip 27 between them. Molten metal is supplied during a casting campaign from a ladle (not shown) to a tundish 23, through a refractory shroud 24 to a removable tundish 25 (also called distributor vessel or transition piece), and then through a metal delivery nozzle 26 (also called a core nozzle) between the casting rolls 22 above the nip 27. Molten steel is introduced into removable tundish 25 from tundish 23 via an outlet of shroud 24. The tundish 23 is fitted with a slide gate valve (not shown) to selectively open and close the outlet 24 and effectively control the flow of molten metal from the tundish 23 to the caster. The molten metal flows from removable tundish 25 through an outlet and optionally to and through the core nozzle 26.

Molten metal thus delivered to the casting rolls 22 forms a casting pool 30 above nip 27 supported by casting roll surfaces 22A. This casting pool is confined at the ends of the rolls by a pair of side dams or plates 28, which are applied to the ends of the rolls by a pair of thrusters (not shown) comprising hydraulic cylinder units connected to the side dams. The upper surface of the casting pool 30 (generally referred to as the "meniscus" level) may rise above the lower end of the delivery nozzle 26 so that the lower end of the deliver nozzle 26 is immersed within the casting pool.

Casting rolls 22 are internally water cooled by coolant supply (not shown) and driven in counter rotational direction by drives (not shown) so that shells solidify on the moving casting roll surfaces and are brought together at the nip 27 to produce the thin cast strip 12, which is delivered downwardly from the nip between the casting rolls.

Below the twin roll caster 11, the cast steel strip 12 passes within a sealed enclosure 10 to the guide table 13, which guides the strip through an X-ray gauge used to measure strip profile to a pinch roll stand 14 through which it exits sealed enclosure 10. The seal of the enclosure 10 may not be complete, but is appropriate to allow control of the atmosphere within the enclosure and access of oxygen to the cast strip within the enclosure. After exiting the sealed enclosure 10, the strip may pass through further sealed enclosures (not shown) after the pinch roll stand 14.

A casting roll controller 94 is coupled to actuators that control all casting roll operation functions. One of the controls is the force set point adjustment. This determines how much force is applied to the strip as it is being cast and solidified between the casting rolls. Oscillations in feedback from the force actuators is indicative of chatter. Force actuator feedback may be provided to the casting roll controller or logged by separate equipment/software.

A controller 92 comprising a trained RL Agent which is coupled to the casting roll controller 94 by, for example, a computer network. The controller 92 provides force actuator control inputs to the casting roll controller 94 and receives force actuator feedback. The force actuator feedback may be from commercially-available data logging software or the casting roll controller 94.

In some embodiments, before the strip enters the hot roll stand, the transverse thickness profile is obtained by thickness gauge 44 and communicated to Controller 92.

The present invention avoids disadvantages of known control systems by employing a model-free reinforcement learning engine, such as a deep Q network that has been trained on metrics from manually controlled process including operator actions and casting machine responses as the RL Agent in controller 92. A DQN is a neural network that approximates the action value of each state-action pair.

In a first embodiment provided below, the configuration and training of an RL Agent having one action and a reward function having one casting machine quality metric is provided. However, this is for clarity of the disclosure and additional actions and casting machine feedback responses may be incorporated in the RL Agent. Additional actions include rolling mill controls. Additional metrics may include cast strip profile measurements and flatness measurements, for example. Also, while the various embodiments disclosed herein use a RL Agent as an example, other model-free adaptive and/or learning agents may also be suitable and may be substituted therefore in any of the disclosed embodiments.

In a first embodiment, the DQN is a function mapping the state to the action values of all actions in the action set, as shown in Equation 1, where Q is the neural network, S is the state information of a sample, and $[q_{a_1}, q_{a_2} \ldots q_{a_N}]$ corresponds to action values of N elements in the action set.

$$Q: (S) \to [q_{a_1}, q_{a_2}, \ldots, q_{a_N}] \quad (1)$$

In some embodiments, the state at time step t is defined as $S_t=[C_t, \delta C_t, F_t, \delta F_t]$ where C and $\delta C$ are the chatter and change in chatter over one time step, respectively, and F and $\delta F$ are the force and change in force over one time step, respectively. In some embodiments, the casting data is recorded at 10 Hz. The force setpoint adjustment made by operators may be downsampled to 0.2 Hz based on the observation that operators generally do not adjust the force setpoint more frequently than this. Given the noise characteristics of the chatter signal, every 50 consecutive samples may be averaged (i.e. average chatter over a 5 second period) to obtain $C_t$. In some embodiments, non-overlapping 5 second blocks are used. Two index subscripts to represent a data sample, namely t and k. The time index t denotes the time step within a single cast sequence. The sample index k denotes the unique index of a sample in the dataset, which contains samples from all cast sequences.

In some embodiments, the action is defined as the change in the force setpoint value between the current time step and the next time step. Unlike the state, which is continuous-valued, the action is chosen from a discrete set $A \in \alpha_i$, $\{i=1, 2, \ldots, N\}$. In the problem considered here, N=4; there are three frequently used force reduction rates and the last action stands for keeping the force value unchanged.

In reinforcement learning (RL), the reward reflects what the user values and what the user avoids. In the context of using RL to design a policy for adjusting a process setpoint, there are two types of information that can be used: 1) the behavior of "expert" operators and 2) performance metrics defined explicitly in terms of the states. Each play a distinct role in defining a reward function that incentivizes the desired behavior.

Given that human operators may control this process as based on general rules of thumb and their individual experience with the process, a reward function that aims to emulate the behavior of operators is a way to capture their expertise without needing a model of their decision-making. On the other hand, if the reward function were to be designed to only emulate their behavior, then the trained RL Agent will not necessarily be able to improve upon the operators' actions. To do the latter, it is useful to consider a second component of the reward function that places value on explicit performance metrics. For example, in the force setpoint adjustment problem addressed in this first embodiment, the desired performance objectives are a short start-up time, below some upper bound $T_{su}$, and a low chatter level, below some upper bound $C_{ub}$, discussed below.

To better characterize different force setpoint adjustment behaviors, a k-means clustering algorithm may be applied to cluster over 200 individual cast sequences, based on the force setpoint trajectory implemented by operators during each cast for a given metal grade and strip width, all of the cast sequences represent the same metal grade and strip width to ensure that differences identified through clustering are a function of the behaviors of the human operator working during each casting campaign for that grade and width.

Additional grades and widths may be characterized in a similar fashion. Alternatively, additional grades and widths can use the same trained RL Agent, but with different starting points assigned to the different grades and widths.

Figure 4:
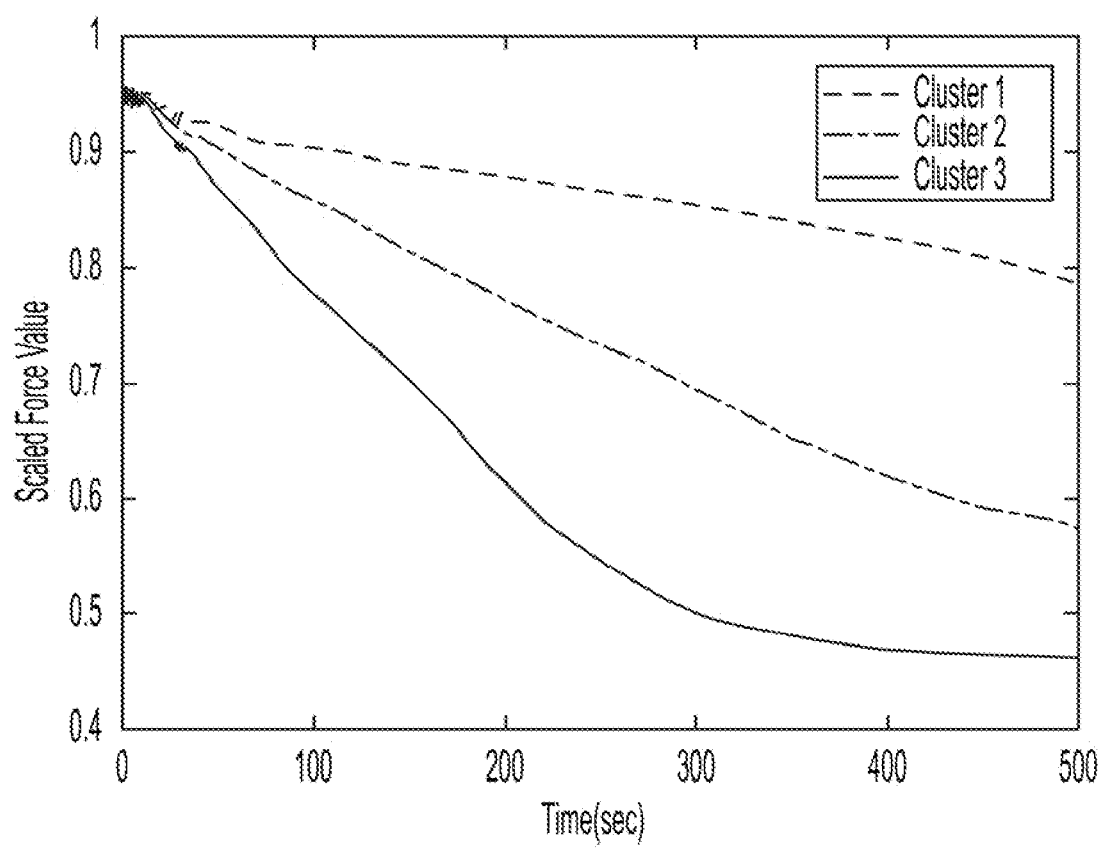
FIG. 4 is a graph of mean force trajectory of clusters of training datasets.
Figure 5A:
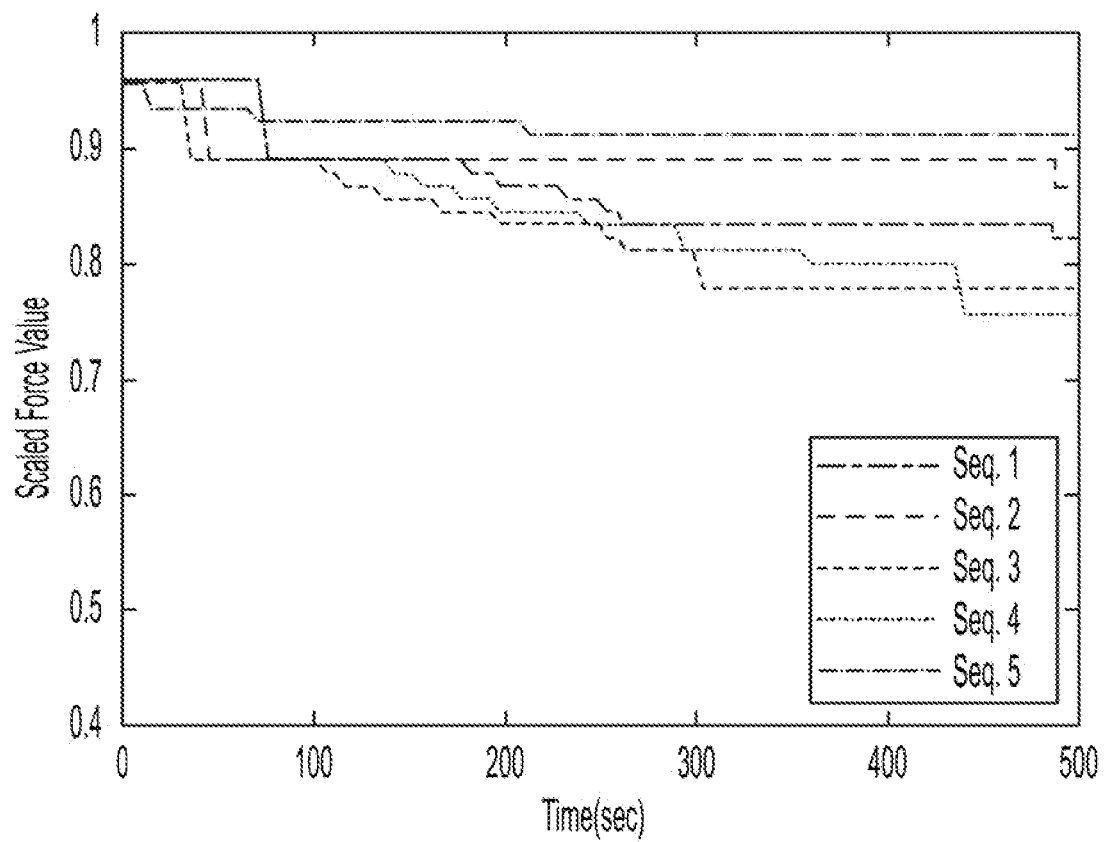
FIG. 5A is a graph of examples of force trajectory of cluster 1 in FIG. 4.
Figure 5B:
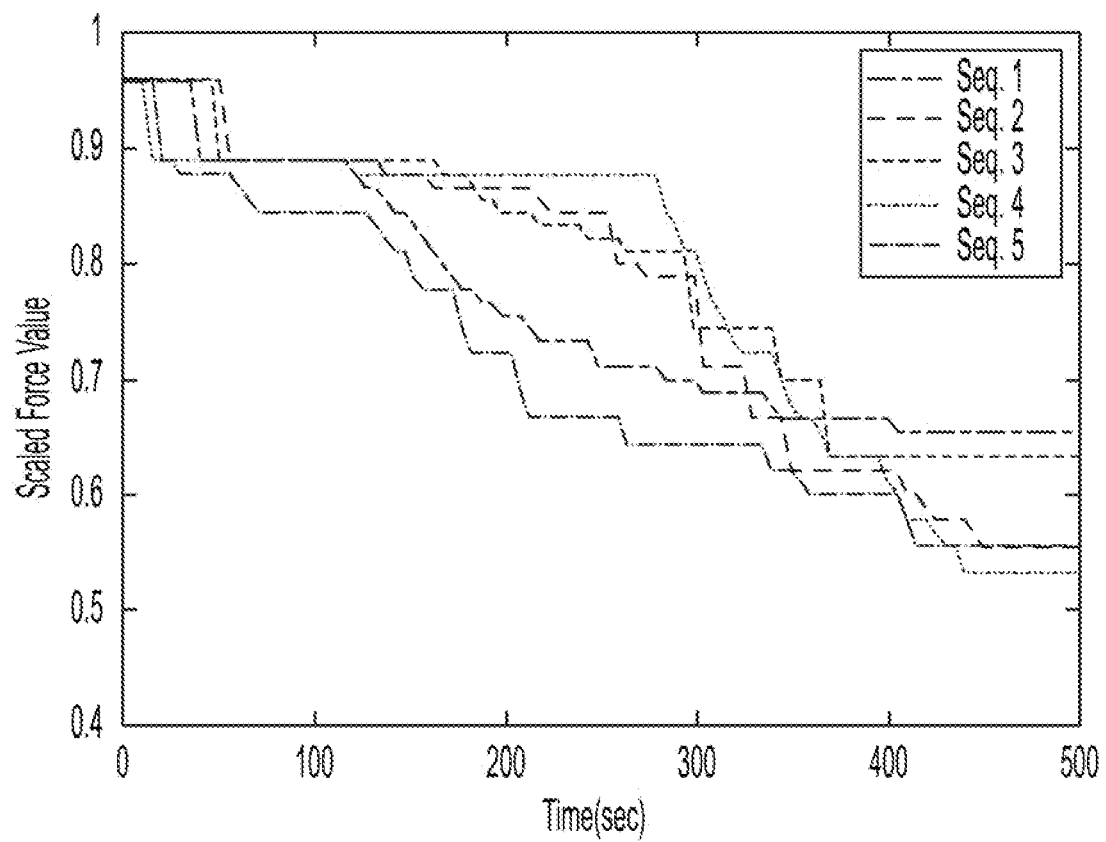
FIG. 5B is a graph of examples of force trajectory of cluster 2 in FIG. 4.
Figure 5C:
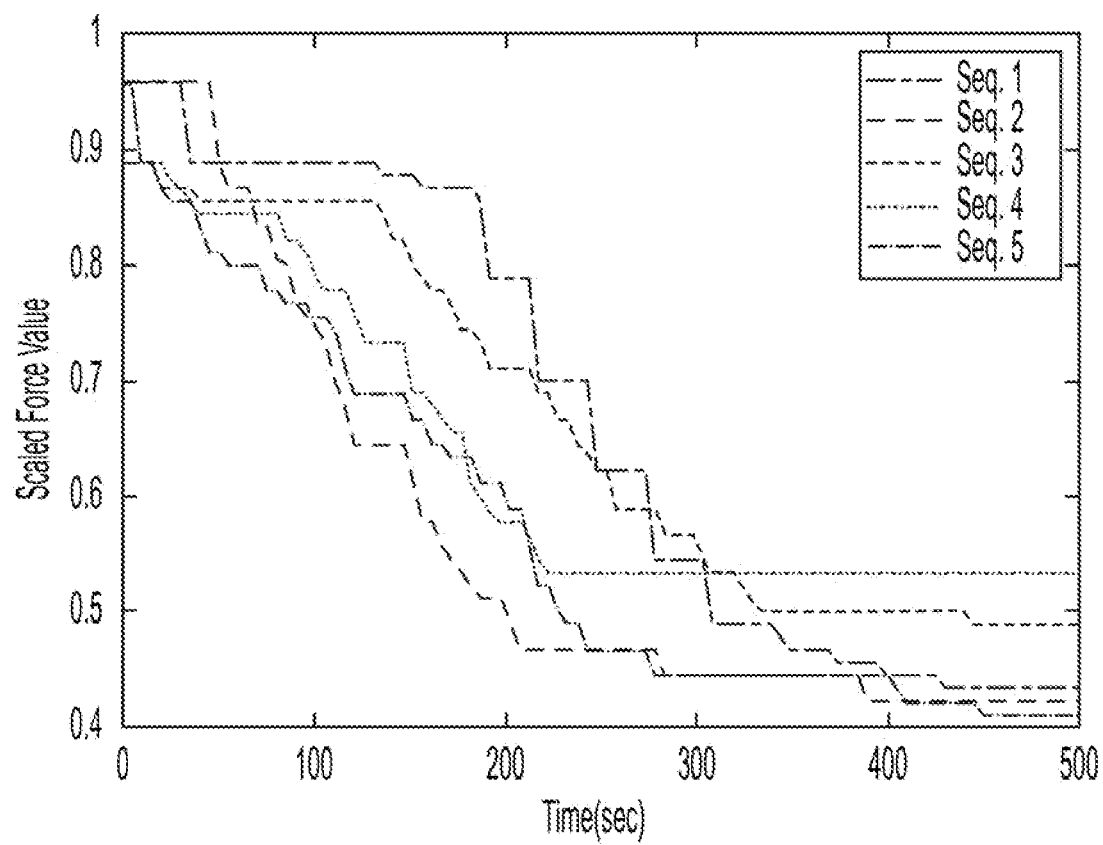
FIG. 5C is a graph of examples of force trajectory of cluster 3 in FIG. 4.
Figure 6A:
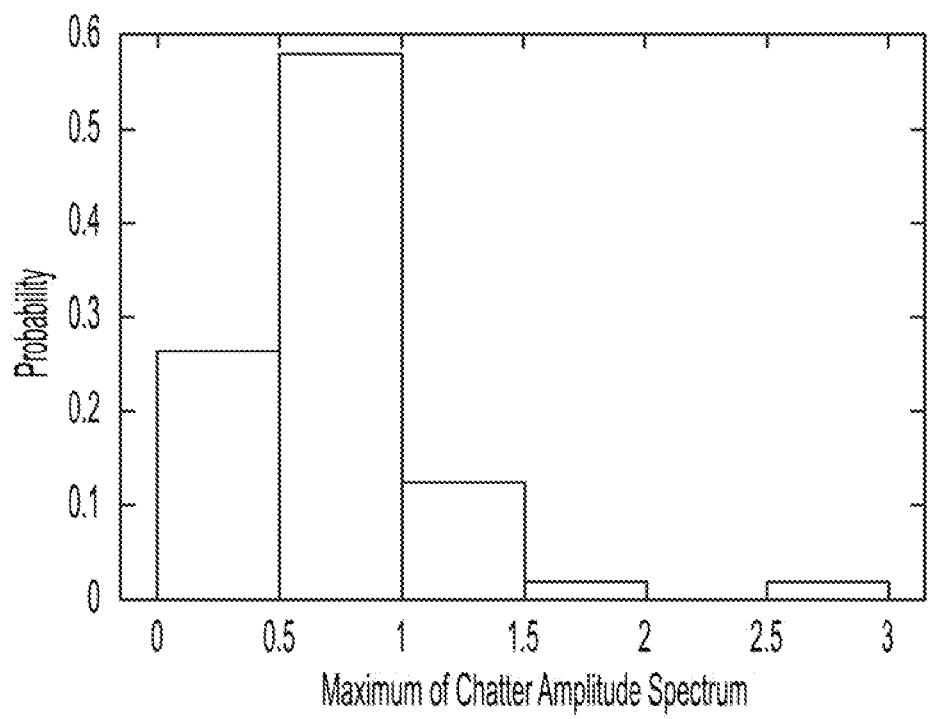
FIG. 6A is a graph of maximum chatter amplitude spectrum of cluster 1 in FIG. 4.
Figure 6B:
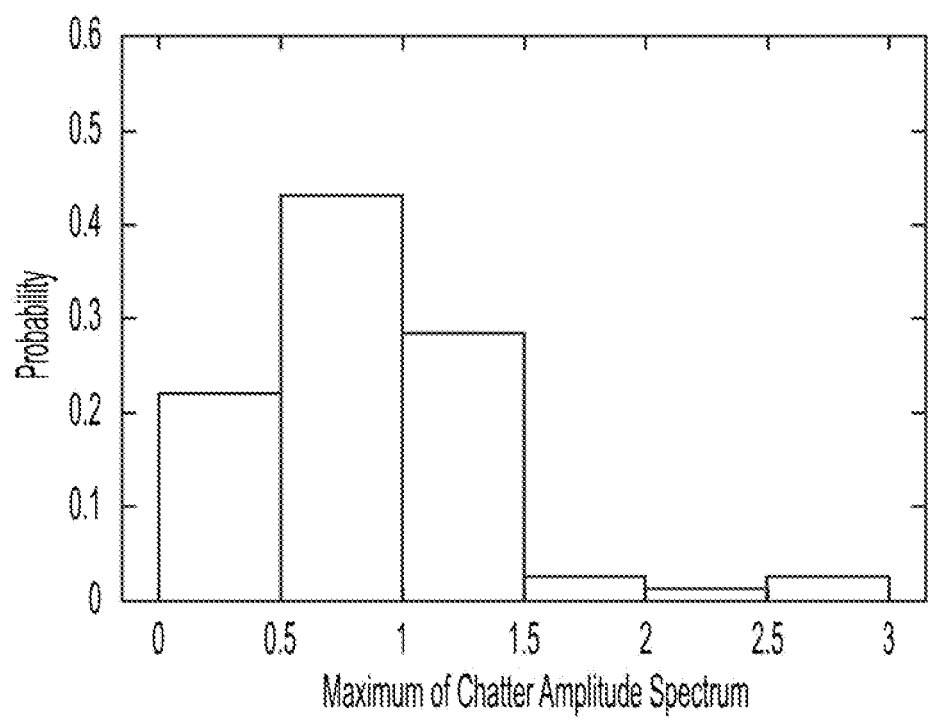
FIG. 6B is a graph of maximum chatter amplitude spectrum of cluster 2 in FIG. 4.
Figure 6C:
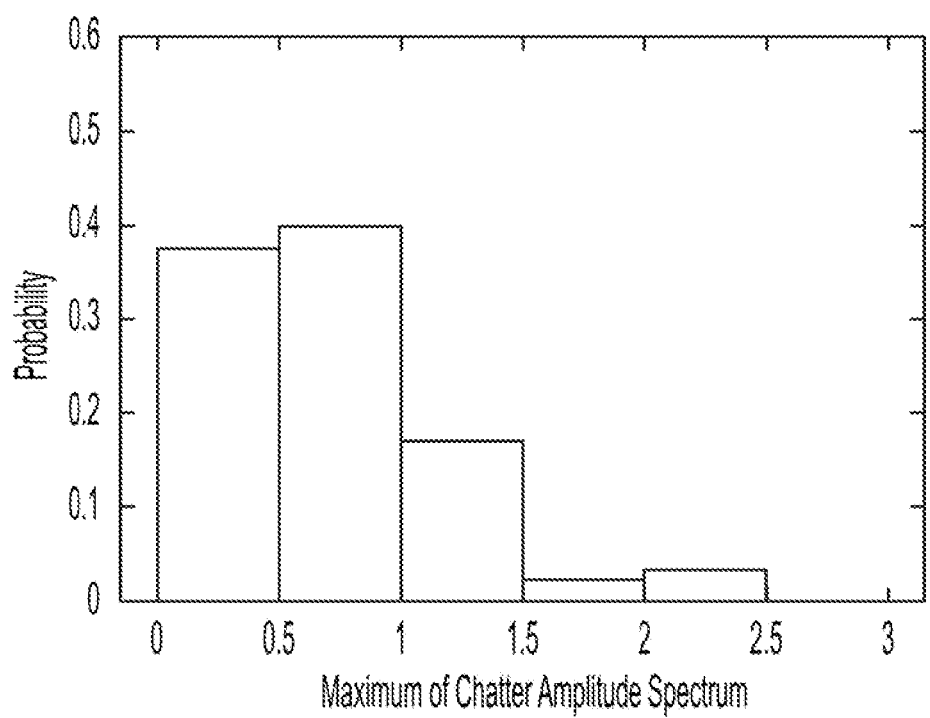
FIG. 6C is a graph of maximum chatter amplitude spectrum of cluster 3 in FIG. 4.

In the example herein, the force setpoint adjustment behavior is characterized by a 500-second period force setpoint trajectory after an initial, automatic adjustment. In one example, among the available cast data sequences, a total of 6 different operators' behavior is represented. During a given cast, the process is operated by a crew of 2 operators, with one responsible for the force setpoint adjustments. To account for distinct force setpoint adjustment behaviors by different crews, training data sets are cluster and preferred behaviors identified. In some embodiments, k={3, 4, 5, 6} for the k-means algorithm. The clustering result is the most stable for k=3 for the data set in this example. Only 2% of the cast sequences keep shifting from one cluster to another. Other values of k may be appropriate for other data sets. FIG. 4 shows the mean force trajectories, computed by averaging each time step's value in the force trajectories of each cluster, separately. FIGS. 5(a)-5(c) show examples from each of the three clusters. FIGS. 6(a)-6(c) show histograms of chatter amplitude for each of three clusters. According to Table I, Cluster 3 has the shortest mean start-up time but not the smallest start-up time variation; Cluster 1 has the smallest start-up time variation but not the shortest mean start-up time.

Cluster 3 is also characterized by the most aggressive setpoint adjustment behavior, both in terms in the rate at which the force setpoint is decreased as well as the total magnitude by which it is decreased. Another feature of the cast sequences belonging to Cluster 3 is that they cover a wider range of force setpoint values due to the aggressive adjustment of the setpoint. Cluster 3 is preferred because it has the shortest average start-up time and the lowest overall chatter level among three force behavior clusters.

TABLE I

Scaled time performance statistics of force clusters; mean start-up time and standard deviation are normalized to Cluster 2.

| Percentage in the dataset (%) | 25.7 | 34.7 | 39.6 |
| Scaled start-up time mean | 0.99 | 1.00 | 0.94 |
| Scaled start-up time standard deviation | 0.78 | 1.00 | 1.21 |

In addition to rewarding emulation of certain operator setpoint adjustment behaviors, the reward function should explicitly incentivize desired performance metrics. With respect to achieving a short start up time, $T_{su}$, it is important to equally reward or penalize each time step, because it is not known whether decisions made near the start of the cast do or do not lead to a short start-up time. To emphasize that cast sequences with different start-up times should be rewarded differently, in some embodiments, the time reward for each step is $$\left[-\exp\left(\frac{Tsu - Tub}{Tub}\right)\right]$$

where $T_{su}$ is start-up time and $T_{ub}$ is the upper bound on the start-up time as deemed acceptable by the user. The exponential function leads to an increasing penalty rate as the sequence start-up time $T_{su}$ approaches the upper bound.

In this embodiment, the second performance objective is to maintain a chatter value below some user-defined threshold. Therefore, a maximum acceptable chatter value, denoted by $C_{ub}$, is defined; if the chatter value is lower than $C_{ub}$, there is no chatter penalty assigned to that step. Mathematically, the chatter reward can be expressed as [min(0, $C_{ub}-C_t$)]. Decreasing the force too much, at the expense of decreasing chatter, can lead to other quality issues with the steel strip. Therefore, a lower bound on the acceptable force, $F_{lb}$ is also enforced.

The total reward function is shown in Equation 2.

$$R_t = 1 + \min(0, C_{ub} - C_t) - \exp\left(\frac{Tsu - Tub}{Tub}\right) + 1(\text{if in preferred cluster}) \quad (2)$$

In addition to the implicit and explicit performance objectives described above, a constant reward is applied at each sample using the first term of $R_t$. According to the casting campaign records, it may be observed that the operators often refrain from decreasing the force setpoint at a given time step when both the chatter value and start-up time are within acceptable levels at a given sample. To incentivize the RL Agent to learn from this behavior, a constant reward is assigned to each sample obtained from operators' cast records. If, for a sample, the sum of both time and chatter penalties (negative rewards) is less than the constant, and the net reward of this sample is still positive. Furthermore, to emphasize that there is a specific type of behavior that is desirable for the RL Agent to learn from, an extra constant may be assigned reward to samples in a cast sequence from the preferred cluster of force behavior, and the net reward of each of these samples will be positive. Associated with a modified training algorithm below, these positive net rewards motivate the RL Agent to follow the operator's behavior under certain situations.

In a typical DQN training process, the RL Agent executes additional trials based on the updated value function and collects more data from new trials. However, the expense of operating an actual twin roll strip steel casting machine, including materials considered and produced renders training the RL Agent to execute trials on an actual casting machine infeasible. In this case, all available samples from operator controlled casting campaigns are collected from the cast to train the value function Q in each training step. Training may be continued on an actual operating casting machine.

In some embodiments, the DQN is initialized and trained using a MATLAB deep learning toolbox. However, other reinforcement learning networks and tools may be used. Specifically, as shown in Algorithm 1, the train( ) function is employed, and states $S_K$ of all samples as network inputs and their corresponding action values $q_K$ are used as labels to train the parameter set φ of the value function.

Algorithm 1 Pseudocode of Deep Q-Network Learning Process (Modified Version)
1: Initialize discount factor γ
2: Initialize the parameter set φ, and create a neural network $Q_φ$.
3: Initialize action values $q_k$ of every sample
4: Train $Q_φ$ with all samples: $Q_φ$←train($Q_φ$, $S_K$, $q_K$)
5: for each iteration do
6: Update $q_k$: qk=onehot($A_k$)*$R_k$+(1−d)γ(max($Q_φ(S_{k'})$))*ones(1,N)
7: Train $Q_φ$ with all samples: $Q_φ$←train($Q_φ$, $S_K$, $q_K$)
8: end for as every $q_k$ converges Another modification in the training process is the update of the action values $q_k$. $q_k$ is a 1-by-N vector, and each entry of it represents the action value of one action option. As shown in the following equation:

$$qk = onehot(A_k) * R_k + (1 - d)\gamma(\max(Q_\varphi(S_{k'}))) * ones(1, N),$$

where onehot($A_k$) is the one-hot encoding of the action $A_k$, (a 1-by-N vector with the entry of the selected action being one and the rest being zeros), d is a binary indicator to indicate if the current state is the terminal of a trajectory, ones is a 1-by-N vector with all entries being ones, and $S_{k'}$ is the state one time step after the current state $S_k$. This equation updates the action value of the selected action as the sum of the immediate reward and a discounted maximum value of the state at the next time step. However, for those actions not being selected, instead of approximating their action values by using the value function from the previous iteration, their action values are set as zero plus the discounted maximum value of the next state. This $q_k$ update works more like a labeling process of a classification problem. If the immediate reward is positive, the trained RL Agent is more likely to act as the operator does, and increasing the immediate reward raises the likelihood of emulating the operator's behavior. Conversely, if the immediate reward is negative, the action selected by the operator is less likely to be selected than the other N−1 actions not being selected. In addition, the likelihood of selecting each of the N−1 actions increases equally.

By combining the DQN with a greedy policy and selecting the most valuable action under each given state, the trained RL Agent can adjust the force setpoint. The RL Agent is asked to provide force setpoint adjustments based on available cast sequence data and record the force setpoint trajectory for each cast sequence in the validation set. A more specific testing process is shown in Algorithm 2.

Figure 7:
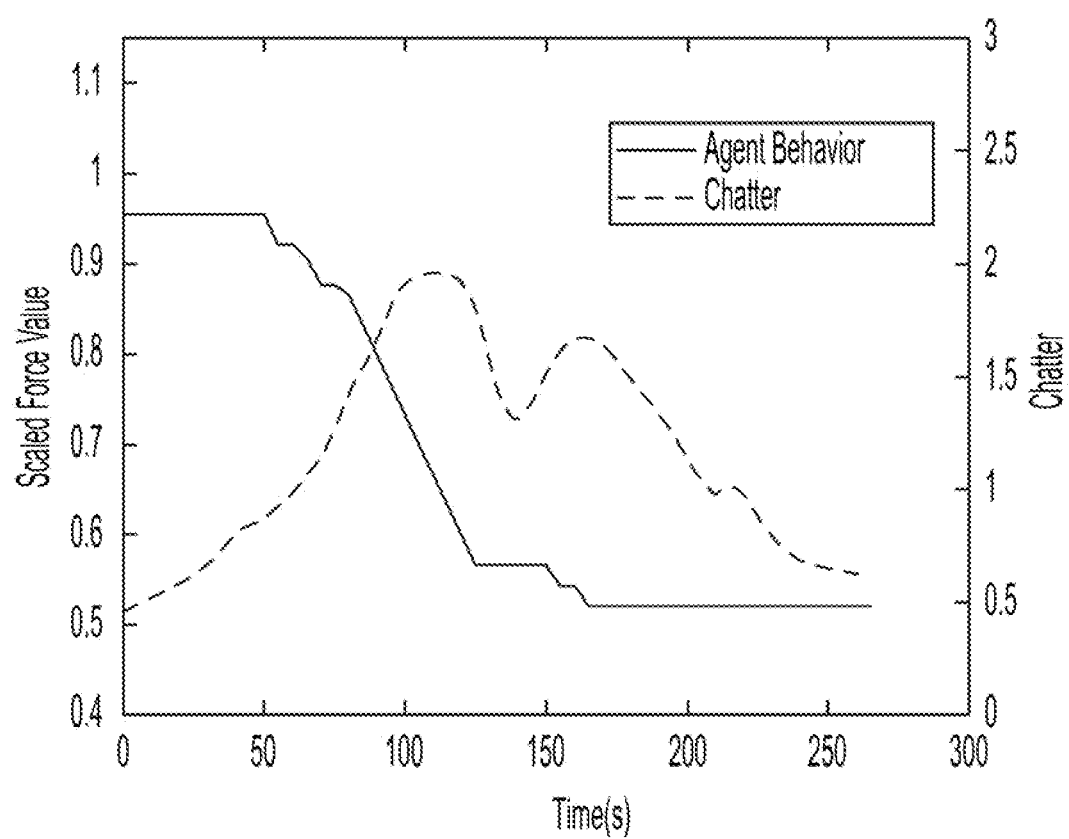
FIG. 7 a plot an RL Agent's force setpoint value trajectory and the associated chatter trajectory.

Algorithm 2 Pseudocode of the Agent Examination
 1: Obtain $F_1$, $C_1$, $C_0$ from cast sequence data
 2: Initialize $\delta(F_1)=0$
 3: Calculate $\delta(C_1)=C_1-C_0$
 4: Form the first state: $S_1=[F_1, \delta(F_1), C_1, \delta(C_1)]$
 5: Import the trained action-value function Q
 6: Initialize time step t=1
 7: for each time step t do
 8: Calculate the action values at the current state: $[q_{a_1}^t, q_{a_2}^t, \ldots, q_{a_N}^t] \leftarrow Q(S_t)$
 9: Select action based on the action values: $A_t \leftarrow \operatorname{argmax}_{a_i}(q_{a_i}^t)$
 10: Obtain $C_{t+1}$ from the cast sequence.
 11: Calculate $\delta(C_{t+1}) \leftarrow C_{t+1}-C_t$
 12 if $F_t \geq F_{lb}$ then
 13: Update $\delta(F_{t+1}) \leftarrow A_t$
 14: Calculate $F_{t+1} \leftarrow F_t + A_t$
 15: else
 16: Update $\delta(F_{t+1}) \leftarrow 0$
 17: Calculate $F_{t+1} \leftarrow F_t$
 18: end if
 19: Form the next state: $S_{t+1} \leftarrow [F_{t+1}, \delta(F_{t+1}), C_{t+1}, \delta(C_{t+1})]$
 20: Update t++1
 21: end for Until cast sequence ends Algorithm 2 is used to calculate and collect each RL Agent's force decision-making trajectories under different chatter scenarios. FIG. 7 contains the RL Agent's force setpoint value trajectory and the associated chatter trajectory under which these force adjustments are made for $T_{ub}$=500, $C_{ub}$=0.5, and with a preference for operator behavior described by Cluster 3. The RL Agent begins to reduce the force setpoint as the chatter exceeds the specified threshold and/or the chatter has an increasing trend; similarly, the RL Agent halts further reduction of the force setpoint as the chatter decreases below the threshold and/or the chatter shows a decreasing trend. As expected, these results are consistent with the design of the reward function.

To demonstrate the sensitivity of the trained RL Agent to the operator data used for training, two different preferred clusters are created. The first contains only cast sequences from the most aggressive cluster (Cluster 3 from the k-means clustering results) while the second contains cast sequences from both the most aggressive cluster (Cluster 3) and the moderate cluster (Cluster 2). Both RL Agents are trained with the same dataset but different preferred cluster settings. Cast sequences belonging to Cluster 3 are considered as preference in both training settings because these data include system operation across the full range of possible force state values, whereas data belonging to Clusters 1 and 2 did not.

Figure 8:
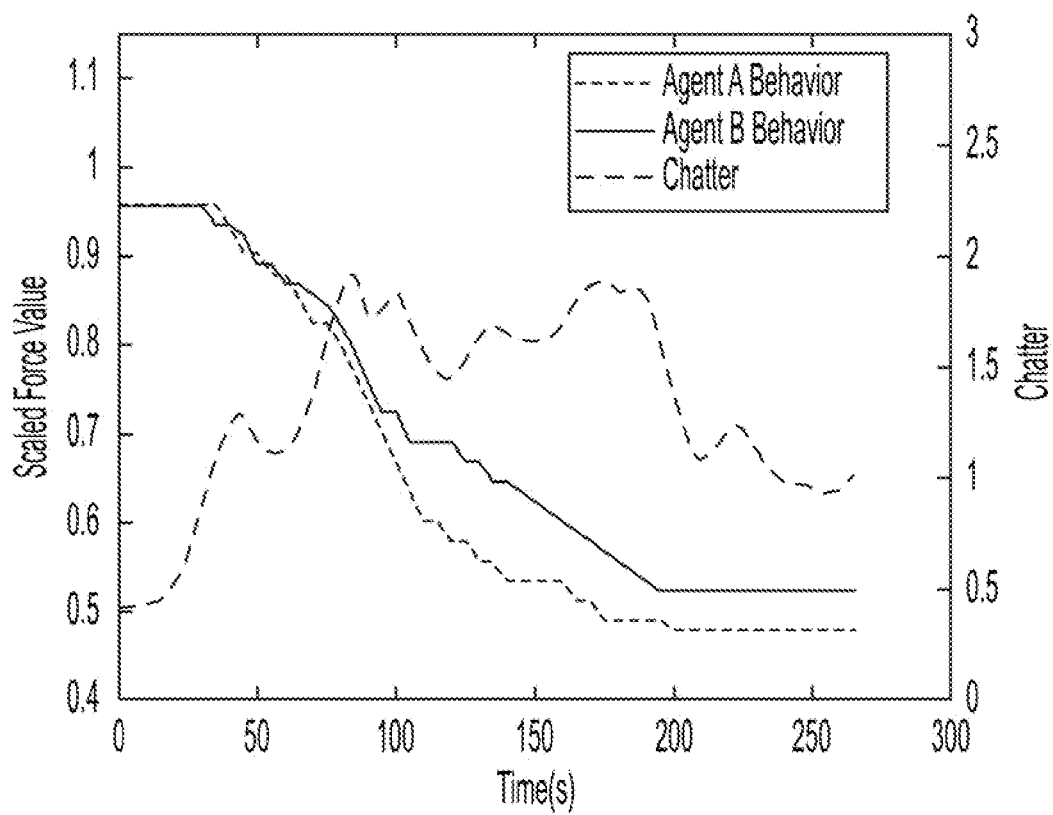
FIG. 8 a plot comparing two RL Agent's force setpoint value trajectories and the associated chatter trajectory.
Figure 9:
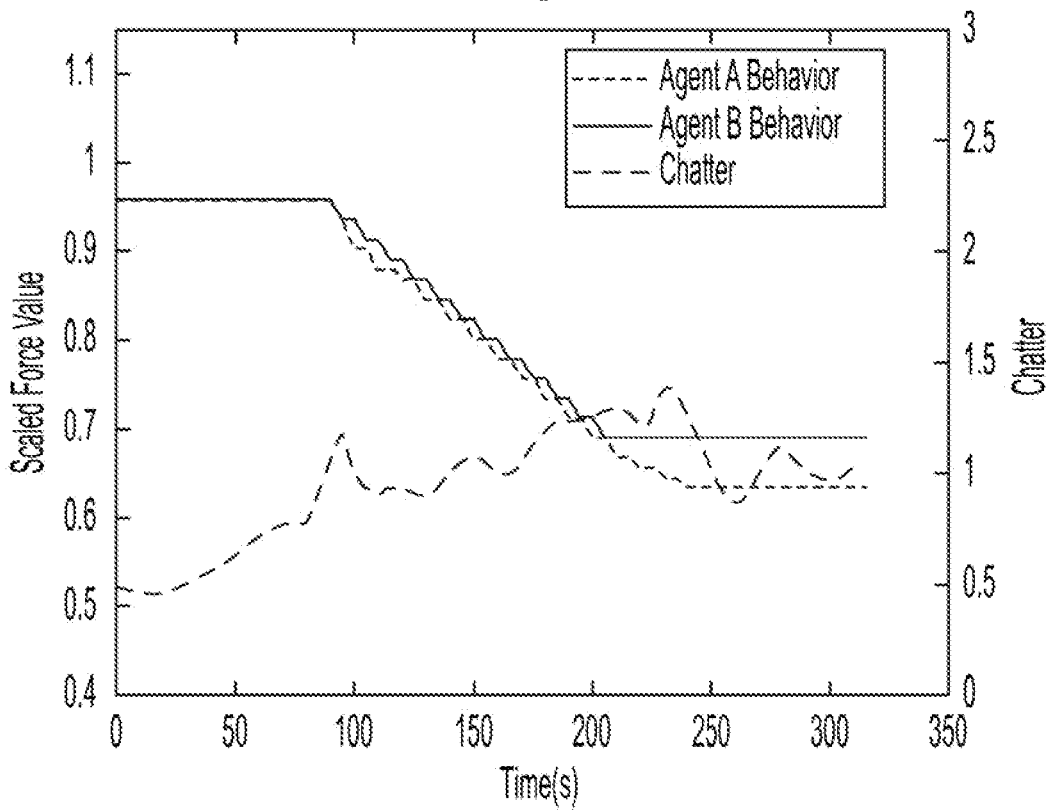
FIG. 9 a second plot comparing two RL Agent's force setpoint value trajectories and the associated chatter trajectory.

FIGS. 8 and 9 give examples of RL Agent reactions under different chatter scenarios. RL Agent A, the one trained with the reward function preferring the most aggressive operator behavior, chooses to decrease the force setpoint more rapidly than RL Agent B, which was trained with the reward function preferring both moderate and aggressive operator behavior. These results are consistent with the design of the reward function and demonstrate how the choice of operator behavior used for training influences each RL Agent.

To demonstrate the sensitivity of the reward function to changes in the performance specifications, other parameters in the reward function may be fixed but vary the maximum acceptable chatter value, $C_{ub}$, and train two RL Agents. Table II shows details of the reward function settings of two RL Agents.

TABLE II

Agents C and D parameter settings

| Agent | Chatter value threshold $C_{ub}$ | Start-up time threshold $T_{ub}$ | Preferred Cluster |
|---|---|---|---|
| C | 0.5 | 500 | 3 |
| D | 1 | 500 | 3 |

Figure 10:
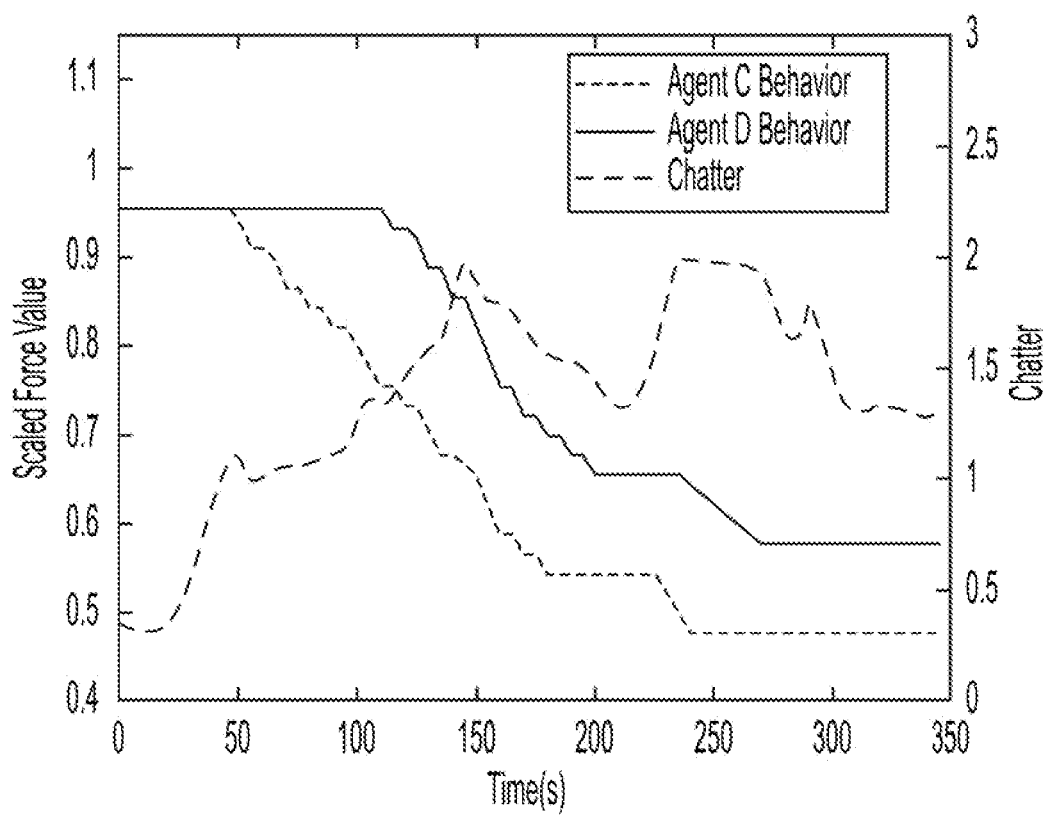
FIG. 10 a third plot comparing two RL Agent's force setpoint value trajectories and the associated chatter trajectory.
Figure 11:
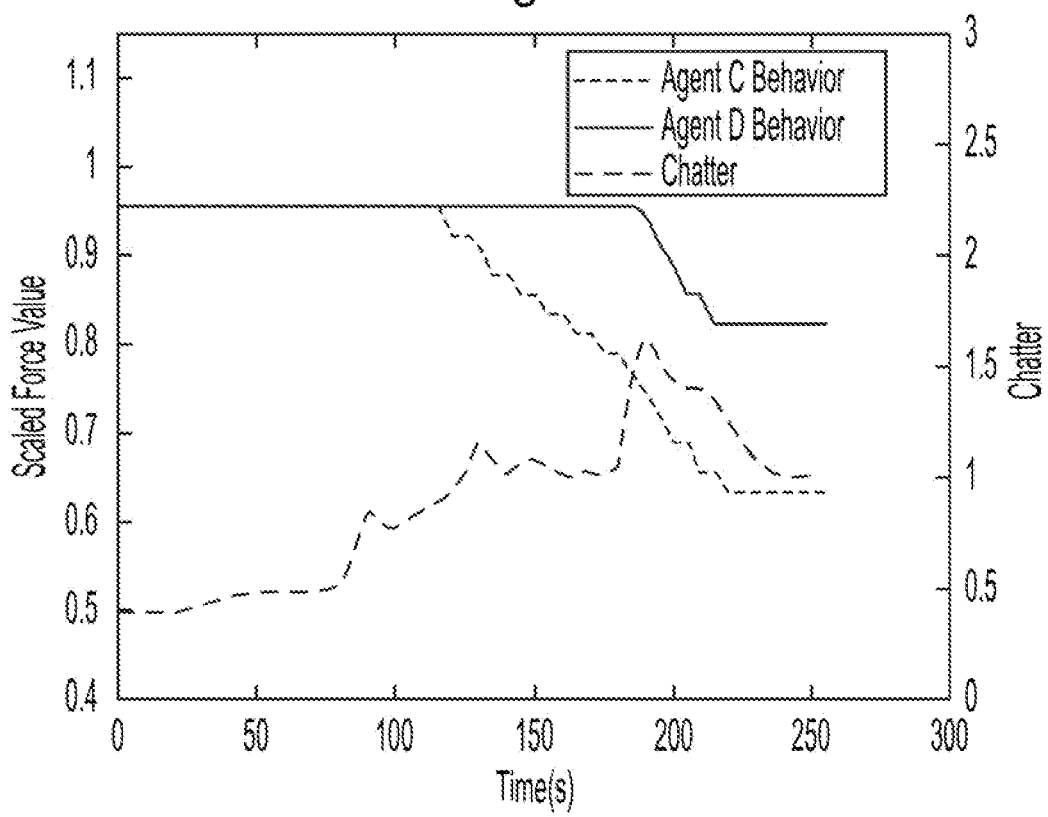
FIG. 11 a fourth plot comparing two RL Agent's force setpoint value trajectories and the associated chatter trajectory.

FIGS. 10 and 11 provide examples of RL Agent reactions under different chatter scenarios. RL Agent C, trained with a lower maximum acceptable chatter value, displays a more aggressive force adjustment behavior than RL Agent D, the one trained with a higher maximum acceptable chatter value. This is again consistent with the design of the reward function and demonstrates how the performance specifications affect each RL Agent's behavior even when the same data is used to train each RL Agent.

Ultimately, the purpose of training an RL Agent to automatically adjust the force setpoint is to improve the performance and consistency of the twin-roll strip casting process (or other process as may be applicable). To validate the trained RL Agent before implementing the RL Agent on an operating twin-roll caster, the trained RL Agent's behavior is directly compared to that of different human operators. Because the RL Agent is not implemented on an online casting machine for validation purposes, the comparison is between the past actions of the operator (in which their decisions impacted the force state and in turn, the chatter) to what the RL Agent would do given those particular force and chatter measurements. Nonetheless, this provides some basis for assessing the differences between human operator and machine RL Agent.

Figure 12:
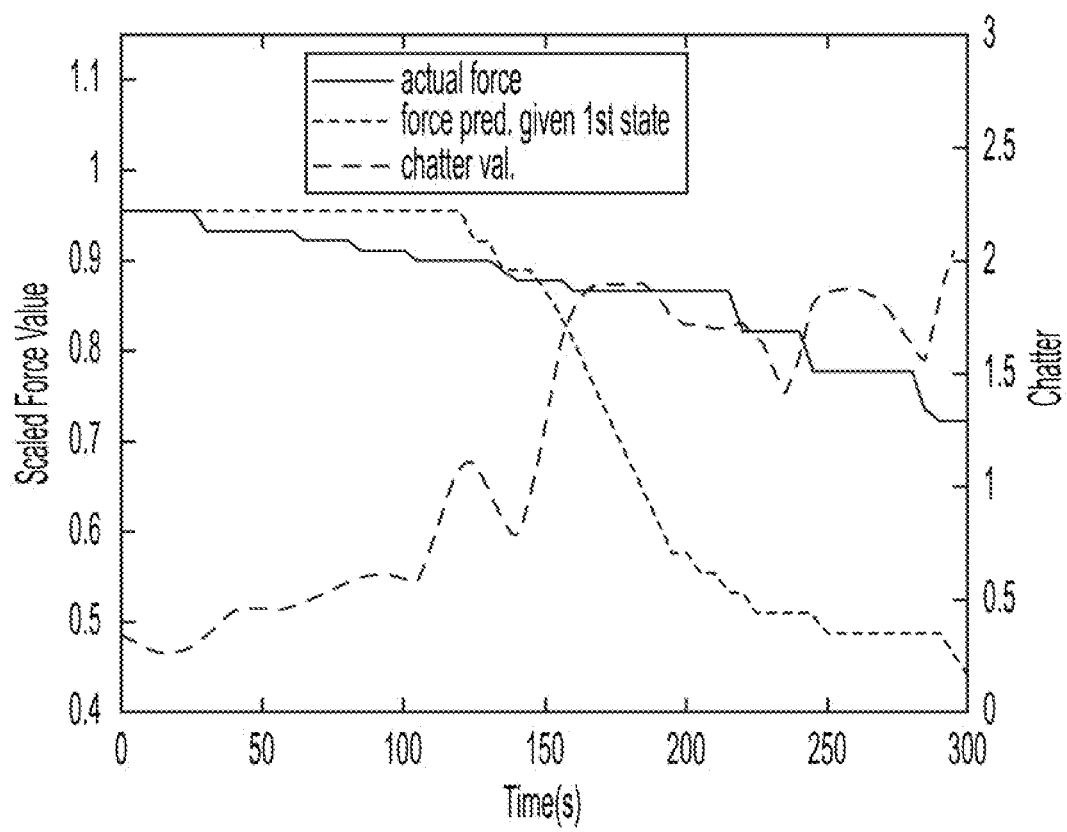
FIG. 12 a plot comparing an RL Agent's force setpoint value trajectories to an operator's force setpoint value trajectories and the associated chatter trajectory.
Figure 13:
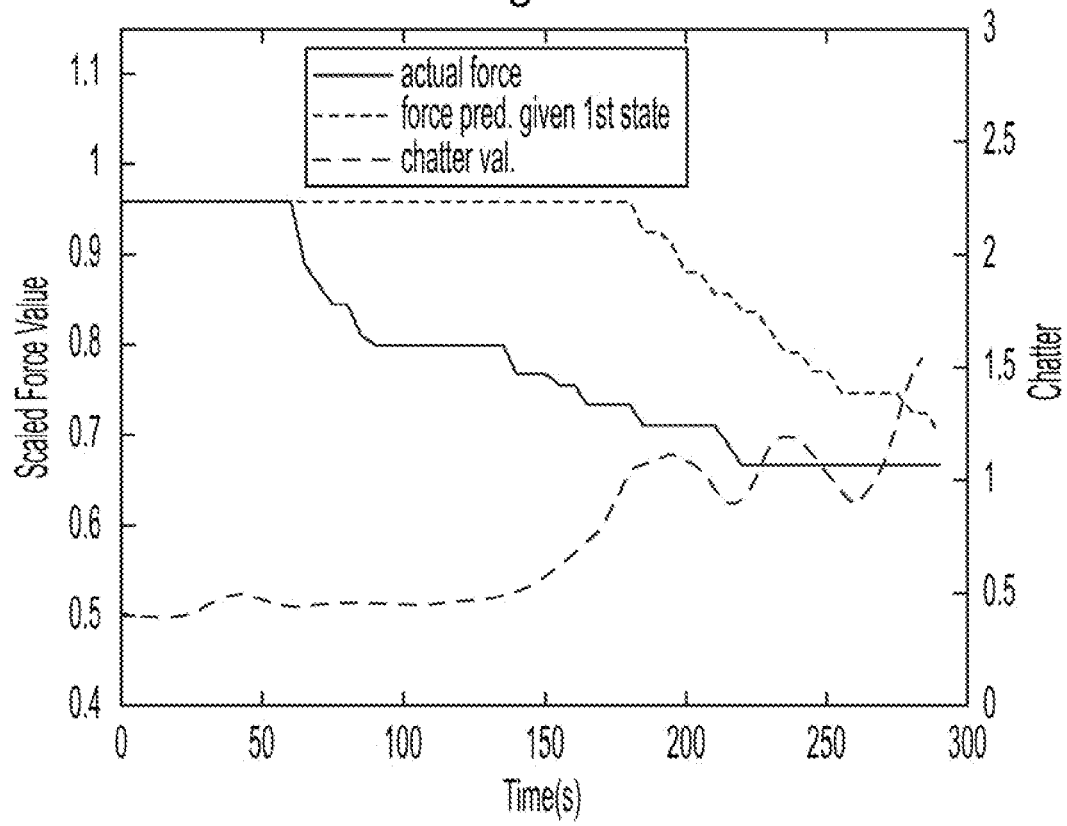
FIG. 13 a second plot comparing an RL Agent's force setpoint value trajectories to an operator's force setpoint value trajectories and the associated chatter trajectory.

In one example, RL Agent C is compared with a human operator behavior in two different casts. In FIG. 12, the operator does not reduce the force setpoint even though the chatter shows a strong increasing trend. In FIG. 13, the operator starts to reduce the force before the chatter begins to increase. Engineers with expertise in twin-roll strip casting evaluated these comparisons and deemed the RL Agent's behavior to be preferable over that of the human operator. However, it is important to note that in each case, the human operator may be considering other factors, beyond chatter, affecting the quality of the strip that may explain their decision-making during these casts.

In some embodiments, additional casting machine responses are added to the reward function. For example, in some embodiments, strip profile is measured by gauge 44 and provided to the RL Agent 92. Gauge 44 may be located between the casting rollers and the hot rolling mill 16. Strip profile parameters may include edge bulge, edge ridge, maximum peak versus 100 mm, and high edge flag. Each of these may be assigned an upper boundary. As with the chatter reward function, reward functions for profile parameters are designed to assign negative reward as the measured parameters approach their respective upper bound. These reward functions may be scaled, for example, to assign equal weight to each parameter, and then summed. The sum may be scaled to ensure the chatter reward term is dominant, at least during start up. An example of such a reward function is:

$$R_{obj} = \min(0, C_{ub} - C) + \frac{1}{4}\left(\sum_{i \in \{bg, rg, mp, fg\}} \min \frac{(0, i_{ub} - i)}{\lambda_i}\right) - \exp\left(\frac{T_{st} - T_{ub}}{T_{ub}}\right)$$

where C is chatter, bg is edge bulge, rg is edge ridge, mp is max peak versus 100 mm, and fg is high edge flag. This results in the reward function having a chatter score and a profile score. Additional profile parameters that may be measured and included in a reward function include overall thickness profile, profile crown, and repetitive periodic disturbances related to the rotational frequency of the casting rolls.

In another embodiment, each of the embodiments described above can be extended to operating the casting machine in a steady state condition, after the start-up time as passed. In some embodiments, the reward function is modified, for example, to eliminate the start-up time term. For example, in the embodiment having both chatter and profile terms provided above, the reward function may be modified as follows:

$$R_{obj} = \min(0, C_{ub} - C) + \frac{1}{4}\left(\sum_{i \in \{bg, rg, mp, fg\}} \min \frac{(0, i_{ub} - i)}{\lambda_i}\right)$$

The relative weights of the chatter and profile reward functions may also be adjusted.

In other embodiments, a different reward function is developed for steady state operation and a different RL Agent is trained for steady state operations. In other embodiments, a model-based A.I. agent is developed and trained for steady state operation. In some embodiments, one or more model based controllers are operated concurrently with a trained model-free RL Agent. For example, an Iterative Learning Controller may control wedge to reduce periodic disturbances as in WO 2019/060717A1, which is incorporated by reference, and any of the RL Agents described herein may effectuate the actions to reduce chatter and/or profile defects.

Additional actions may also be assigned to the RL Agent. For example, the RL Agent may be trained to reduce periodic disturbances by controlling wedge control for the casting rollers. Some embodiments include localized temperature control of the casting rollers to control casting roller shape and thereby cast strip profile. See, for example, WO 2019/217700, which is incorporated by reference. In some embodiments, the strip profile measurements are used in a reward function so the RL Agent can control the localized heating and/or cooling of the casting rolls to control strip profile.

Actions may also be extended to other portions of the twin roll caster process equipment, including control of the hot rolling mill 16 and water jets 18. For example, various controls have been developed for shaping the work rolls of the hot rolling mill to reduce flatness defects. For example, work roll bending jacks have been provided to affect symmetrical changes in the roll gap profile central region of the work rolls relative to regions adjacent the edges. The roll bending is capable of correcting symmetrical shape defects that are common to the central region and both edges of the strip. Also, force cylinders can affect asymmetrical changes in the roll gap profile on one side relative to the other side. The roll force cylinders are capable of skewing or tilting the roll gap profile to correct for shape defects in the strip that occur asymmetrically at either side of the strip, with one side being tighter and the other side being looser than average tension stress across the strip. In some embodiments, a RL Agent is trained to provide actions to each of these controls in response to measurements of the cast strip before and/or after hot rolling the strip to reduce thickness.

Another method of controlling a shape of a work roll (and thus the elongation of cast strip passing between the work rolls) is by localized, segmented cooling of the work rolls. See, for example, U.S. Pat. No. 7,181,822, which is incorporated by reference. By controlling the localized cooling of the work surface of the work roll, both the upper and lower work roll profiles can be controlled by thermal expansion or contraction of the work rolls to reduce shape defects and localized buckling. Specifically, the control of localized cooling can be accomplished by increasing the relative volume or velocity of coolant sprayed through nozzles onto the work roll surfaces in the zone or zones of an observed strip shape buckle area, causing the work roll diameter of either or both of the work rolls in that area to contract, increasing the roll gap profile, and effectively reducing elongation in that zone. Conversely, by decreasing the relative volume or velocity of the coolant sprayed by the nozzles onto the work surfaces of the work rolls causes the work roll diameter in that area to expand, decreasing the roll gap profile, and effectively increasing elongation. Alternatively or in combination, the control of localized cooling can be accomplished by internally controlling cooling the work surface of the work roll in zones across the work roll by localized control of temperature or volume water circulated through the work rolls adjacent the work surfaces. In some embodiments, a RL Agent is trained to provide actions to provide localized, segmented cooling of the work rolls in response to casting mill metrics, such as flatness defects.

In some embodiments, the RL Agent in any of the above embodiments receives reinforcement learning not only from casting campaigns controlled manually by operators, but also from the RL Agent's own operation of a physical casting machine. That is, in operation, the RL Agent continues to learn through reinforcement learning including real-time casting machine metrics in response to the RL Agent's control actions, thereby improving the RL Agent's and the casting machine's performance.

In some embodiments, intelligent alarms are included to alert operators to intervene if necessary. For example, the RL Agent may direct a step change but receive an unexpected response. This may occur, for example, if a sensor fails or an actuator fails.

The functional features that enable an RL agent to effectively drive all process set points and also enable process and machine condition monitoring constitutes an autonomously driven twin roll casting machine where an operator is required to intervene only in the instances where there is a machine component breakdown or a process emergency (such as failure of a key refractory element).

It is appreciated that any method described herein utilizing any reinforced learning agent as described or contemplated, along with any associated algorithm, may be performed using one or more controllers with the reinforced learning agent is stored as instructions on any memory storage device. The instructions are configured to be performed (executed) using one or more processors in combination with a twin roll casting machine to control the formation of thin metal strip by twin roll casting. Any such controller, as well as any processor and memory storage device, may be arranged in operable communication with any component of the twin roll casting machine as may be desired, which includes being arranged in operable communication with any sensor and actuator. A sensor as used herein may generate a signal that may be stored in a memory storage device and used by the processor to control certain operations of the twin roll casting machine as described herein. An actuator as used herein may receive a signal from the controller, processor, or memory storage device to adjust or alter any portion of the twin roll casting machine as described herein.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Furthermore, it is understood that the features of any specific embodiment discussed herein may be combined with one or more features of any one or more embodiments otherwise discussed or contemplated herein unless otherwise stated.

What is claimed is:

1. A twin roll casting system, comprising:
   a pair of counter-rotating casting rolls having a nip between the casting rolls and capable of delivering cast strip downwardly from the nip;
   a casting roll controller configured to adjust at least one process control setpoint between the casting rolls in response to control signals;
   a cast strip sensor capable of measuring at least one parameter of the cast strip; and
   a controller coupled to the cast strip sensor to receive cast strip measurement signals from the cast strip sensor and coupled to the casting roll controller to provide control signals to the casting roll controller, the controller comprising a reinforcement learning (RL) Agent, the RL Agent generating control signals for the casting roll controller in response to a reward function having a first term rewarding emulating human operation of the at least one process control setpoint and a second term rewarding a short set-up time.

2. The system of claim 1, wherein the RL Agent is model-free.

3. The system of claim 1, wherein the RL Agent is a model-free Deep Q Network.

4. The system of claim 1, wherein the reward function further has a third term rewarding maintaining the at least one parameter of the cast strip below a threshold.

5. The system of claim 1, wherein the cast strip sensor comprises a thickness gauge that measures a thickness of the cast strip in intervals across a width of the cast strip.

6. The system of claim 1, wherein the at least one process control setpoint comprises a force setpoint between the casting rolls; and
   wherein the at least one parameter of the cast strip comprises chatter.

7. The system of claim 1, wherein the at least one process control setpoint comprises a force setpoint between the casting rolls; and
   wherein the at least one parameter of the cast strip comprises chatter; and
   wherein the reward function further has a third term rewarding maintaining the chatter below a threshold.

8. The system of claim 1, wherein the at least one process control setpoint comprises casting roll crown; and wherein the at least one parameter of the cast strip comprises cast strip profile.

9. The system of claim 1, wherein the RL Agent is trained on a plurality of training datasets, and wherein the training datasets are clustered, and the first term of the reward function comprises emulating behavior from a preferred cluster.

10. The system of claim 1, wherein the at least one parameter of the cast strip comprises chatter and at least one strip profile parameter.

11. The system of claim 10, wherein the at least one strip profile parameter is selected from the group consisting of edge bulge, edge ridge, maximum peak, and high edge flag.

12. A method of operating a twin roll casting system having a pair of counter-rotating casting rolls having a nip between the casting rolls and capable of delivering cast strip downwardly from the nip and a casting roll controller configured to adjust at least one process control setpoint between the casting rolls in response to control signals, the method comprising:
    measuring at least one parameter of the cast strip;
    receiving measurements corresponding to the at least one parameter by a controller, the controller comprising an reinforcement learning (RL) Agent, the RL Agent generating control signals for the casting roll controller in response to a reward function having a first term rewarding emulating human operation of the at least one process control setpoint and a second term rewarding a short set-up time; and providing the control signals to the casting roll controller.

13. The method of claim 12, wherein the RL Agent is a model-free Deep Q Network.

14. The method of claim 12, wherein the at least one process control setpoint comprises a force setpoint between the casting rolls; and wherein the at least one parameter of the cast strip comprises chatter.

15. The method of claim 12, wherein the at least one process control setpoint comprises a force setpoint between the casting rolls; and wherein the at least one parameter of the cast strip comprises chatter; and wherein the reward function further has a third term rewarding maintaining the chatter below a threshold.

16. The method of claim 12, wherein the at least one parameter of the cast strip comprises chatter and at least one strip profile parameter.

17. The method of claim 16, wherein the at least one strip profile parameter is selected from the group consisting of edge bulge, edge ridge, maximum peak, and high edge flag.

\* \* \* \* \*